2213X
S. Fitch.
Grain Winnower.
Patented Oct. 29, 1814.
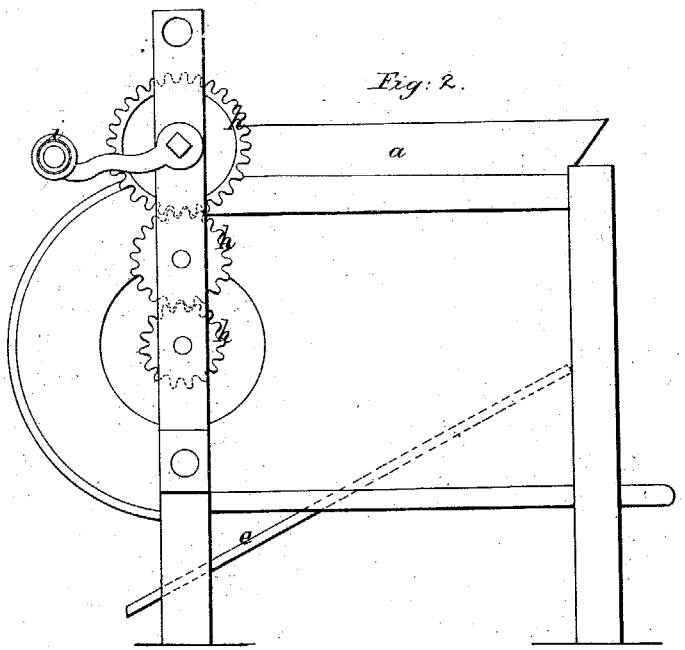
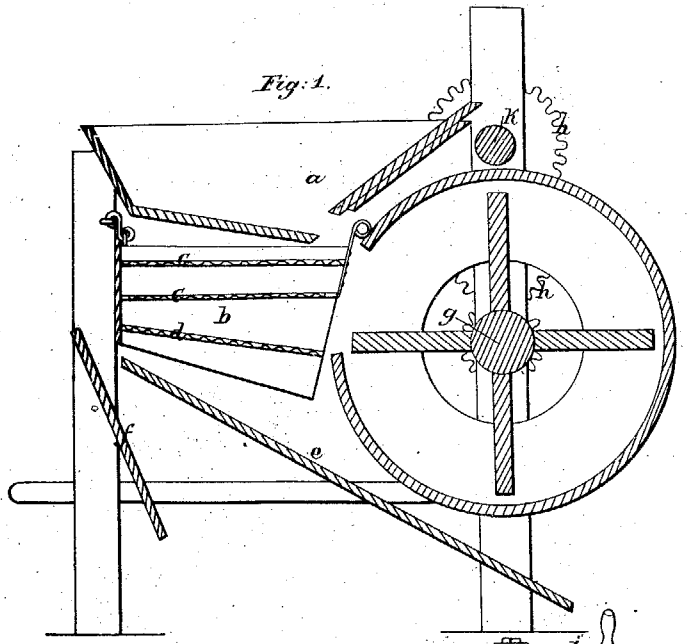
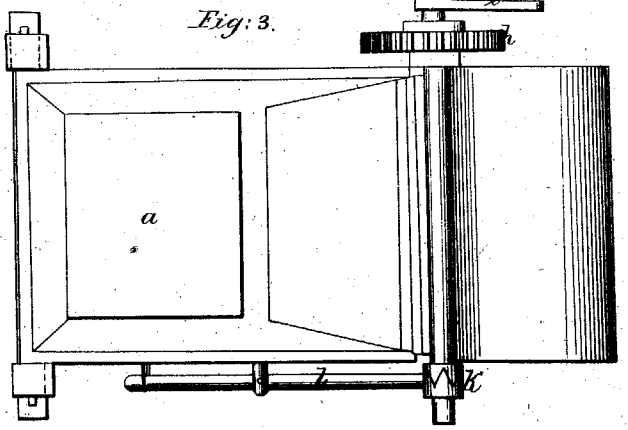

[illegible] Oct 29, 1814 2213X

Samuel [illegible]

Letters Patent

The schedule referred to in these Letters Patent and making part of the same Containing a description in the words of the said Samuel [illegible] himself of his improvement in Fanning Mills.

It consists of a frame from four to five feet in length, from three to four in height and from two to three in breadth. A drum of Circular Shape set in the frame and united to it a hopper and shoe frame supported by two iron [illegible] attached to the upper part of the principal frame and confined at one end by a wooden pin near the side of the hopper on which pin the shoe frame swings horizontally. This shoe frame contains three sieves two of which are slid hori-zontally into the shoe frame and the third nailed to its bottom in a sloping direction and inclining towards the drum or drawer situated be-low the shoe frame an inclined plane descending from the lower sieve [illegible] down to the bottom of the frame directly under the drum a sliding board in the rear of the sieves through the drum at a large circular opening in the sides pass-es a shaft in which are framed four wings at right angles this shaft runs on steel or iron gudgeons boxed into the same [illegible] an iron crank which turns a wooden cylinder to one of which is screwed a cast iron cog wheel parallel with the [illegible] to the shaft passing through the drum [illegible] end of which is screwed a cast iron cog wheel these three or more cast iron cog wheels are in diameter proportionally as [illegible] three inches, the lar-gest of which is turned by the crank, this turns the intermediate wheel & that the shaft with its wings inside of the drum. In the uppermost cog [illegible] is cut a [illegible] Channel in this Channel [illegible] an iron cog fixed into one end of the lever which has a horizontal position near the side of the frame extends almost its whole length and is confined near its middle by a pin driven through a mortise in which the lever rests. To the other end of this lever is fastened an iron hook which is hooked [illegible] sides of the shoe frame. The drum is enclosed nearly round having a piece of [illegible] [illegible] [illegible] at the top
directly under the hopper by which the wind is made to pass horizontally
through the shoe frame. The crank turns the shaft and wings and at the
same time gives a side motion to the lever that causes the shoe frame
to swing. The grain after being cleansed by the wind from the Drum in
passing through the sieves precipitates itself down the inclined plain which
is provided a channel for its conveyance, the chaff is blown quite away and
the screen under the sieves catches the cockle and other spurious seeds Witnesses Test. A. [illegible] [illegible] — Samuel Fitch H. G. [illegible]

Drawing made [illegible]. [532 words]